(12) United States Patent
Maher et al.

(10) Patent No.: US 6,533,467 B2
(45) Date of Patent: Mar. 18, 2003

(54) OPTICAL FIBER FERRULE APPARATUS AND METHOD

(75) Inventors: Christopher B. Maher, Post Falls, ID (US); David Damiano, Greenacres, WA (US)

(73) Assignee: Telect, Inc., Liberty Lake, WA (US)

( * ) Notice: Subject to any disclaimer, the term of this patent is extended or adjusted under 35 U.S.C. 154(b) by 165 days.

(21) Appl. No.: 09/759,596

(22) Filed: Jan. 11, 2001

(65) Prior Publication Data

US 2003/0031450 A1 Feb. 13, 2003

(51) Int. Cl.$^7$ ................................................ G02B 6/36
(52) U.S. Cl. ........................................................ 385/78
(58) Field of Search ............................................ 385/78

(56) References Cited

U.S. PATENT DOCUMENTS

| | | |
|---|---|---|
| 3,684,474 A | 8/1972 | Chisholm .................... 65/105 |
| 3,910,677 A | 10/1975 | Becker et al. |
| 4,039,309 A | 8/1977 | Albanese et al. |
| 4,084,308 A | 4/1978 | Runge |
| 4,090,778 A * | 5/1978 | Phillips et al. .............. 264/1.25 |
| 4,195,045 A | 3/1980 | Mead |
| 4,208,093 A | 6/1980 | Borsuk |
| 4,362,360 A * | 12/1982 | Mannschke ............ 250/227.24 |
| 4,565,558 A | 1/1986 | Keil et al. |
| 4,589,897 A | 5/1986 | Mathyssek et al. |
| 4,622,055 A | 11/1986 | Mathyssek et al. |
| 4,671,609 A | 6/1987 | Khoe et al. |
| 4,708,426 A | 11/1987 | Khoe |
| 4,737,009 A * | 4/1988 | Kakii et al. ..................... 385/59 |
| 4,770,487 A | 9/1988 | Williams |
| 5,016,963 A | 5/1991 | Pan |
| 5,037,174 A | 8/1991 | Thompson |
| 5,256,851 A | 10/1993 | Presby |
| 5,457,759 A | 10/1995 | Kalonji et al. |
| 5,551,968 A | 9/1996 | Pan |
| 5,638,471 A | 6/1997 | Semo et al. |
| 5,772,720 A | 6/1998 | Taira-Griffin et al. |
| 6,074,100 A | 6/2000 | Rowland et al. |
| 6,106,368 A | 8/2000 | Childers et al. |

* cited by examiner

*Primary Examiner*—Akm E. Ullah
(74) *Attorney, Agent, or Firm*—Wells St. John P.S.

(57) ABSTRACT

Disclosed is an optical fiber ferrule apparatus and a method for manufacturing the ferrule apparatus. More particularly, this invention pertains to a ferrule preparation apparatus and method in which the optical fiber is severed through the application of a combination of energy and forced physical separation.

18 Claims, 8 Drawing Sheets

FIG. 18

OPTICAL FIBER FERRULE APPARATUS AND METHOD

TECHNICAL FIELD

This invention pertains to an optical fiber ferrule apparatus and a method for severing an optical fiber secured within a fiber optic ferrule. More particularly, this invention pertains to a ferrule preparation apparatus and method in which the fiber is severed through the application of a combination of energy and physical separation.

BACKGROUND OF THE INVENTION

Optical fibers are becoming more widely used as a transmission media, and the increased use has increased the need for optical fiber connections to operatively connect one optical fiber to another. The operative connection is typically an aligned connection wherein two optical fibers are secured within ferrules. The ferrules are part of a connector assembly and each connector assembly typically has two sides which may be attached together and also detached.

In a typical assembly, an optical fiber is secured in a ferrule by gluing it, and the terminal end of the optical fiber protrudes out the first end of the ferrule.

The predominant way that ferrules with optical fibers glued therein are prepared is that they are severed by manually cleaving them to a location near the first end of the ferrule. Thereafter the terminal end of the ferrule end is sanded and/or polished back to a position such that the terminal end may be more finely polished by a polishing machine.

There are problems with the predominant way of severing the optical fibers, i.e. with the cleaving process.

It is desirable to provide a severing process with a more consistent starting point for the polishing phase of the preparation of the combined ferrule and optical fiber, although not required by this invention.

It is an objective of this invention to provide a more automated system for making an optical fiber ferrule and for severing the optical fiber in the process of making of the ferrule.

It is also believed that automating the process, as some of the embodiments of this invention, may result in a decreased operation time.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

The source of energy may be any one of a number of types of energy or sources thereof, including without limitation, radiant heat, flame heat, radiation waves, electromagnetic waves, laser waves or others, with no one in particular being required to practice the invention.

It should be noted that while the invention is generally described in one of its most common applications, i.e. to an optical fiber in a ferrule, it also equally applies for the severance of the terminal end of an optical fiber in other applications as well, such as in a one piece fiber optic connector and others.

Figure 1:
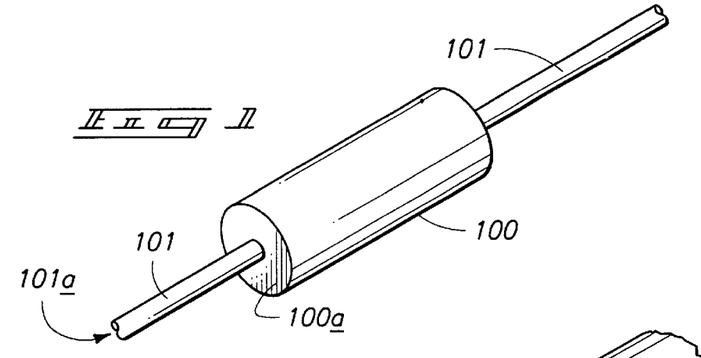
FIG. 1 is a schematic depiction of an optical fiber ferrule with an optical fiber retained therein.

FIG. 1 is a schematic representation of a ferrule 100 with an optical fiber end which has been glued or fixed therein, illustrating the ferrule 100, optical fiber 101, a first end 100a (a terminal end) of ferrule 100, and a terminal end 101a of optical fiber 101. While the ferrule shown is generally cylindrical, there is no particular type of ferrule required to practice this invention and several different types and configurations may be utilized, all within the contemplation of this invention. Likewise while the optical fiber 101 is glued in the ferrule 100 in this embodiment, it may be fixed therein by any one of a number of ways, with no one in particular being required to practice this invention.

Figure 2:
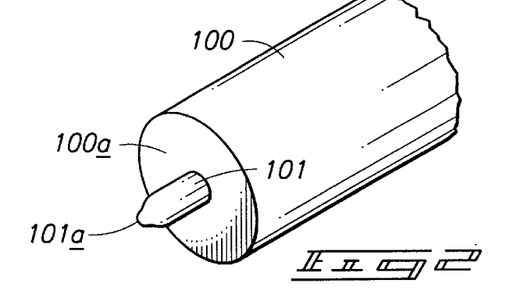
FIG. 2 is a schematic representation of an optical fiber ferrule with a terminal end of an optical fiber protruding from the ferrule, after it has been severed.

FIG. 2 is a schematic representation of a ferrule 100, with a first end 100a, and an optical fiber 101 with a terminal end 101a. FIG. 2 illustrates an optical fiber after it has been severed, and after sanding as provided by the assembly disclosed herein. The ferrule 100 and optical fiber 101 combination shown in FIG. 2 is in a position to proceed to the polishing stage of the manufacture of the product. The optical fiber 101 illustrated in FIG. 2 protrudes further than it otherwise would from first end 100a of ferrule 100 for illustration purposes. There may also be an epoxy dome surrounding the optical fiber 101 where it emerges from the ferrule 100.

Figure 3:
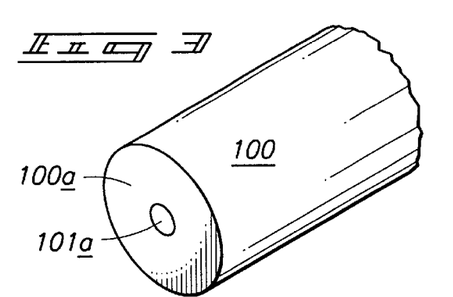
FIG. 3 is a schematic representation of an optical fiber ferrule with the terminal end of an optical fiber at a first end of the ferrule as it is to be for assembly into a fiber optic connector.

FIG. 3 is a schematic representation of ferrule 100 with a first end 100a and the terminal end 101a of the optical fiber illustrated in FIG. 2, after the polishing process and as the ferrule 100 with the optical fiber 101 is in a condition to be placed in a fiber optic connector assembly. There may also be an epoxy dome surrounding the optical fiber 101 where it emerges from the ferrule 100, and instead of being polished or sanded back to the terminal end 100a of the ferrule, the optical fiber 101a may be sanded or polished back to the epoxy dome, as is known in the art.

It should also be noted that when the term ferrule is used herein, it also may refer to and include a one piece fiber optic connector with an integral ferrule contained therein so that the ferrule chuck would be disposed to receive the connectors (however it is sized and configured). It should further be noted that different chucks may be used for different ferrules, as different connectors may use differently sized or configured ferrules, with no one in particular being required to practice this invention. Some chucks will be static and receive the ferrule or connector and others may need relative movement to allow better placement and/or holding of the ferrule or connector in the chuck assembly.

Figure 4:
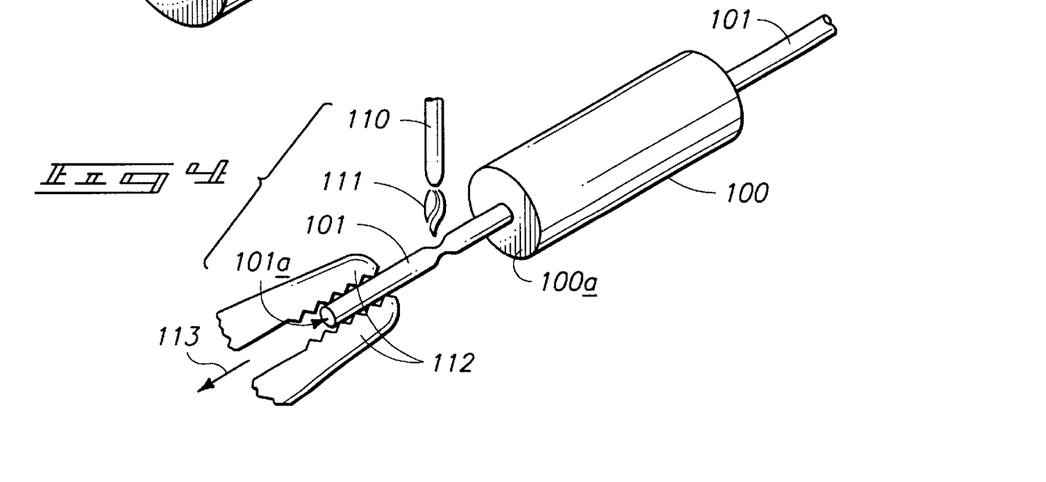
FIG. 4 is a schematic representation of a ferrule with an optical fiber secured therein, with the terminal end of the optical fiber attached to a different apparatus and with a source of energy, applying said energy to the optical fiber to sever it.

FIG. 4 is a schematic representation of certain elements of embodiments of this invention and illustrates ferrule 100 with a first end 100a, optical fiber 101 with a terminal end 101a, gripper assembly 112, source of energy 110 with energy 111 being applied to optical fiber 101. In the schematic representation, the combination of the movement of the gripper assembly 112 is represented by arrow 113 with the energy 111 applied to optical fiber 101, severing the optical fiber. Again, the severance is shown further away from the first end 100a of the ferrule 100 than it would typically be, for illustrative purposes. The source of energy 110 may be radiant heat, a flame or any other source or energy which sufficiently softens the optical fiber 101 to allow it to be severed. A hydrogen oxygen flame boosted with methanol may be used effectively, at any one of a number of different temperatures, one being twenty-seven degrees Centrigrade.

Figure 5:
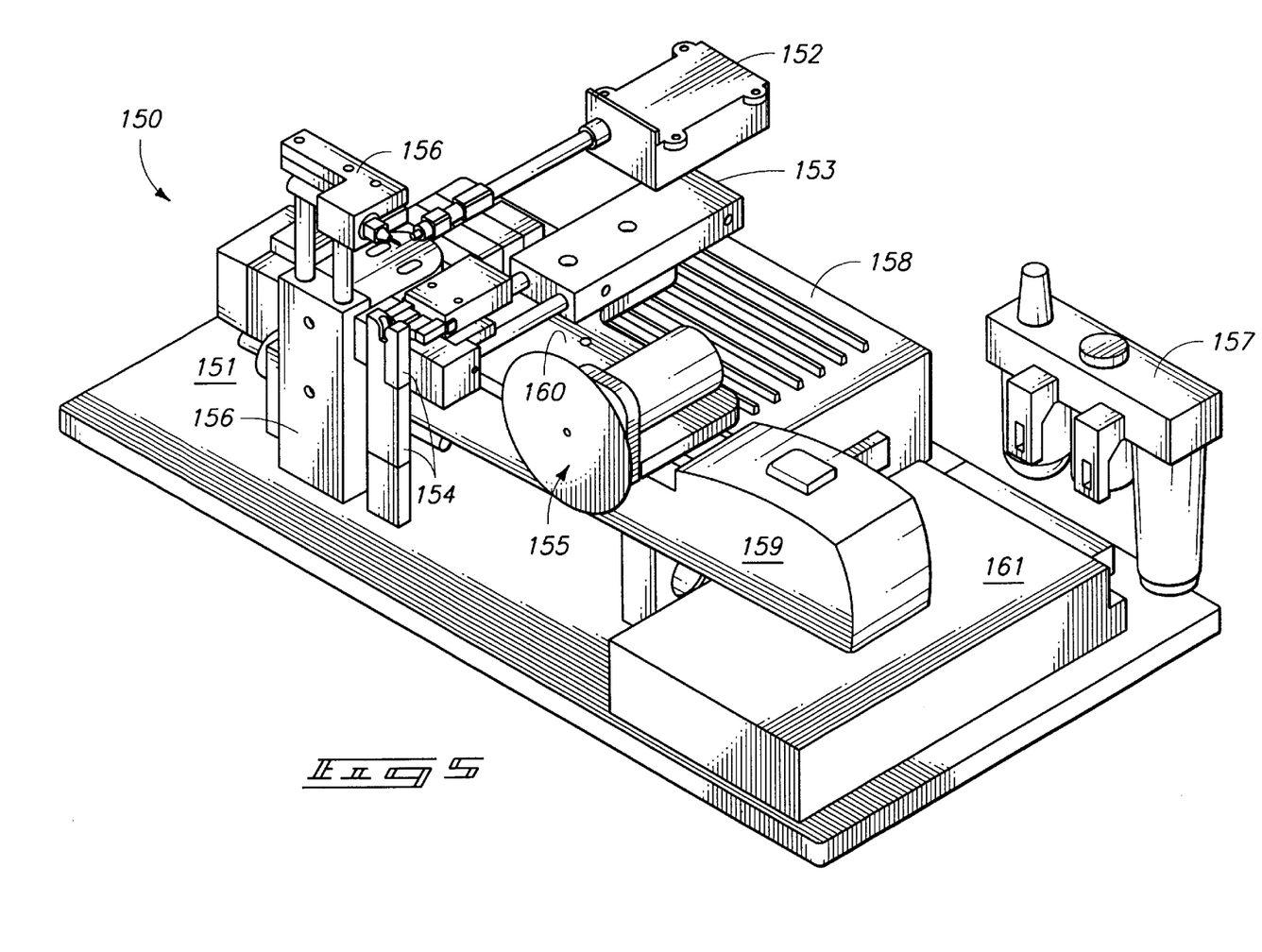
FIG. 5 is a perspective view of one embodiment of an apparatus which may be used as contemplated by this invention.

FIG. 5 illustrates one embodiment of an apparatus which may be used to practice an embodiment of the invention. FIG. 5 illustrates ferrule preparation assembly 150, framework 151, torch ignition assembly 152, gripper assembly 153, chuck assembly 154, sanding head assembly 155, torch assembly 156, air regulator 157, actuator controller 158, actuator 159, mounting plate 160, and power supply assembly 161.

Mounting plate 160 is a plate upon which the gripper assembly 153, the torch assembly 156 and the mounting plate for the sanding head assembly may be mounted. The mount plate 160 slides or moves relative to actuator 159 to alternately place the torch assembly 156 and/or the sanding head assembly 155 relative to the chuck assembly 154. The chuck assembly 154 is mounted on the framework 151.

Figure 6:
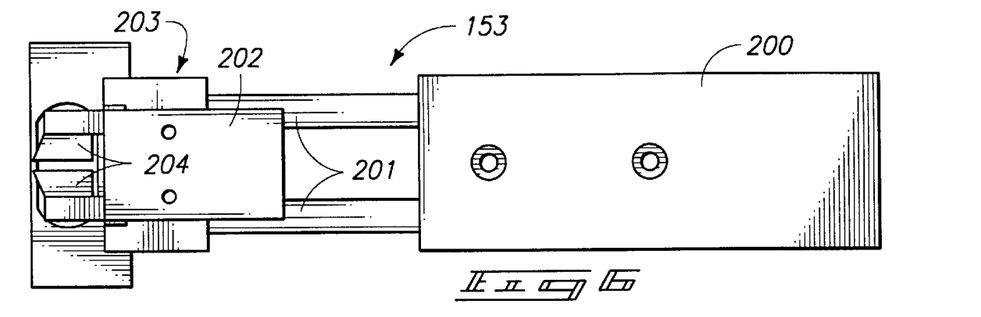
FIG. 6 illustrates one embodiment of a top view of a gripper assembly which may be used in the embodiment of the invention illustrated in FIG. 5.

FIG. 6 shows an embodiment of a gripper assembly 153 as contemplated by this invention, including cylinder housing 200, rods 201, grip jaws 204, gripper 202, and gripper mount bracket 203. As will be appreciated by those of ordinary skill in the art, the grippers are directly actuated with air. A signal from the controller opens a solenoid in providing air to close the gripper, to pneumatically control the assembly. There is a cylinder within the gripping assembly. The rods 201 within cylinder housing 200 move the grip jaws 204 to the terminal end of the optical fiber being gripped. At the appropriate predetermined time when energy or heat is being applied to the optical fiber, grip jaws 204 and/or the gripper 202 are moved back toward cylinder housing 200 to further the severance of the optical fiber. The rods 201 and cylinder housing 200 are commonly known and available.

Figure 7:
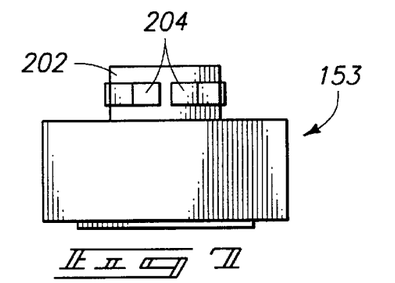
FIG. 7 is an elevation view of the gripper assembly illustrated in FIG. 6.

FIG. 7 is a front elevation view of the gripper assembly 153, illustrating grip jaws 204, gripper 202, and gripper mount bracket 203.

Figure 8:
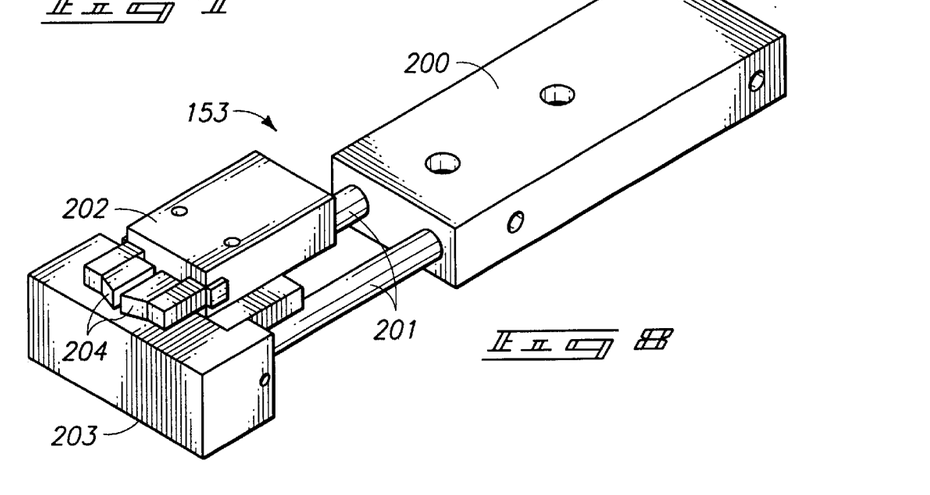
FIG. 8 is a perspective view of the gripper assembly illustrated in FIG. 6.

FIG. 8 is a perspective view of the gripper assembly 153 illustrated in FIG. 6, FIG. 8 showing cylinder housing 200, rods 201, gripper 202, grip jaws 204 and gripper mount bracket 203.

Figure 9:
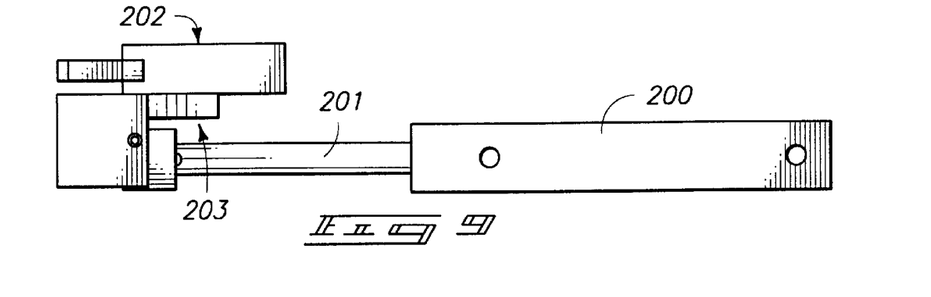
FIG. 9 is a side view of the gripper assembly illustrated in FIG. 6.

FIG. 9 is a side view of the gripping assembly illustrated in FIG. 6 and shows cylinder housing 200, rods 201, gripper mount bracket 203 and gripper 202.

It will be appreciated by those of ordinary skill in the art that gripping the terminal end of the optical fiber is not the only way in which to mechanically or physically move or force apart the terminal end of the optical fiber, but other means may also be employed within the contemplation of this invention, such as for example a blast of air, mechanical arm impacting the optical fiber, or even the impact of the sanding head as it moves into position to sand. It is the combination of the introduction of energy, preferably heat, combined with a mechanical or physical separation, such as the blast of air or the movement of gripping jaws, which are contemplated by this invention.

The cylinder housing 200 shown is an air slide 200 and 201, the gripper mount bracket 203 is a fabricated bracket, the gripper 202 is part of commonly available grippers. Grip jaws 204 may generally be constructed of rubber, such as an eighty durometer rubber material, but this invention is not limited to any particular jaw material and other materials such as steel may be utilized, as will be understood by those of ordinary skill in the art.

Figure 10:
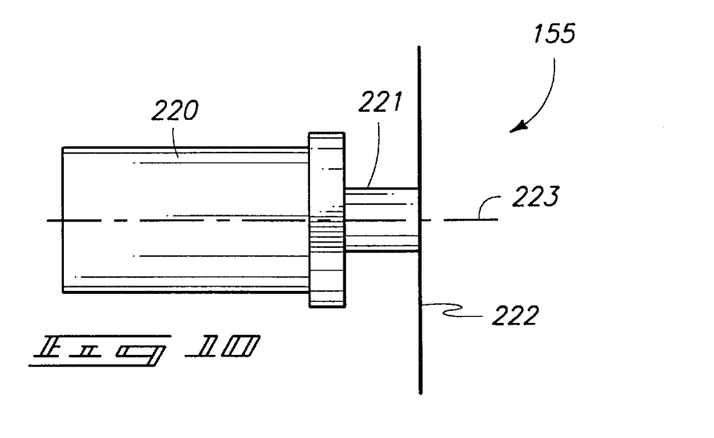
FIG. 10 is a top view of an embodiment of a sanding head assembly which may be used in the embodiment of the apparatus invention illustrated in FIG. 5.

FIG. 10 is a top view of sanding head assembly 155, illustrating sanding motor 220, sanding disk hub 221, sanding disk 222 which may be generally circular (as shown) and may be rotated or pivoted about axis 223 to obtain the sanding motion.

Figure 11:
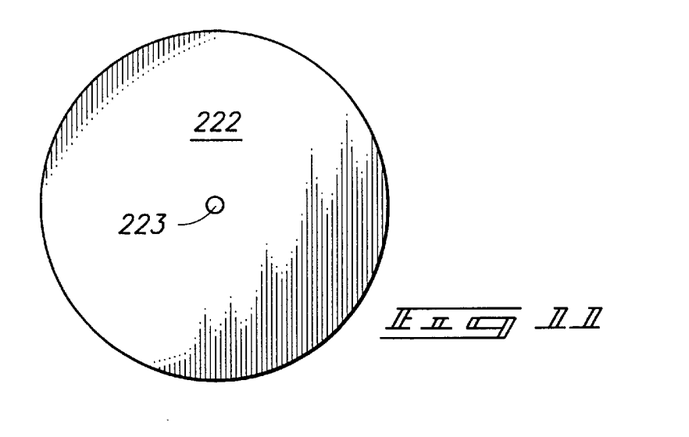
FIG. 11 is an elevation view of the sanding head assembly illustrated in FIG. 10.

FIG. 11 is a front elevation view of sanding disk 222 which pivots about axis 223.

Figure 12:
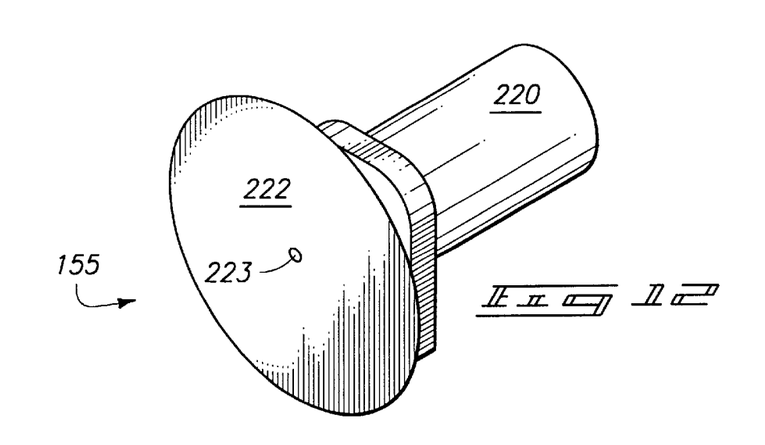
FIG. 12 is a perspective view of the sanding head assembly illustrated in FIG. 10.

FIG. 12 is a perspective view of the sanding head assembly 155 as otherwise illustrated in FIG. 10. FIG. 12 shows sanding motor 220, sanding disk 222 and axis 223 about which the sanding disk rotates, which is also the axis of rotation for sanding motor 220.

It will be appreciated that this invention is not limited to any particular sanding or polishing disk configuration, but any one of a number of known or unknown means may be used, such as a reciprocating disk, a rotating disk, a polishing disk, a dual action or rotation, or any other ways.

Figure 13:
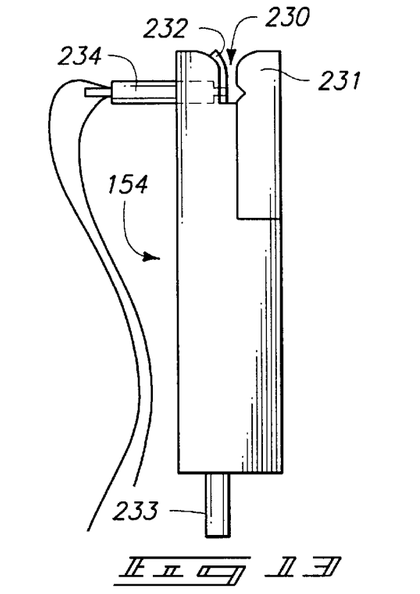
FIG. 13 is an elevation view of an embodiment of a chuck assembly which may be used in the embodiment of the invention illustrated in FIG. 5.

FIG. 13 is a front elevation view of one embodiment of a chuck assembly 154 as contemplated by this invention. FIG. 13 illustrates chuck assembly 154 with chuck assembly aperture 230 into which the optical fiber ferrule is inserted. Chuck assembly jaw 231 may be moved or located to secure or release a ferrule placed therein. The chuck assembly may, with or without a means to further secure, hold or place the ferrule or one piece connector therein. For instance, a micro cylinder may be mounted within or on the gripper assembly and be disposed to engage a ferrule or connector and push it to desired location in the aperture or chuck assembly. A micro-cylinder may be used to open and close the chuck assembly. Micro-cylinder 234 for instance may be used to open and close the gripper 232.

When the term ferrule aperture is used in connection with the chuck assembly, it includes an aperture to receive a ferrule or a connector. The chuck assembly 154 can be mounted to the framework in any one of a number of different ways, such as by brackets.

Figure 14:
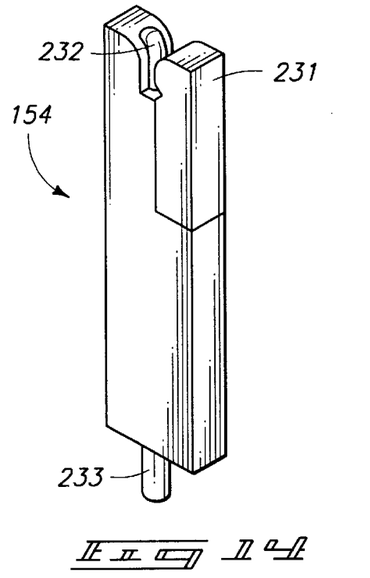
FIG. 14 is a perspective view of the chuck assembly illustrated in FIG. 13.

FIG. 14 is a perspective view of chuck assembly 154, also illustrating tongue 232, chuck assembly jaw 231 and mount post 233.

It will also be appreciated by those of ordinary skill in the art that there are numerous alternatives for providing a chuck assembly 154 for use in an embodiment of this invention, with no one in particular being required to practice the invention.

Figure 15:
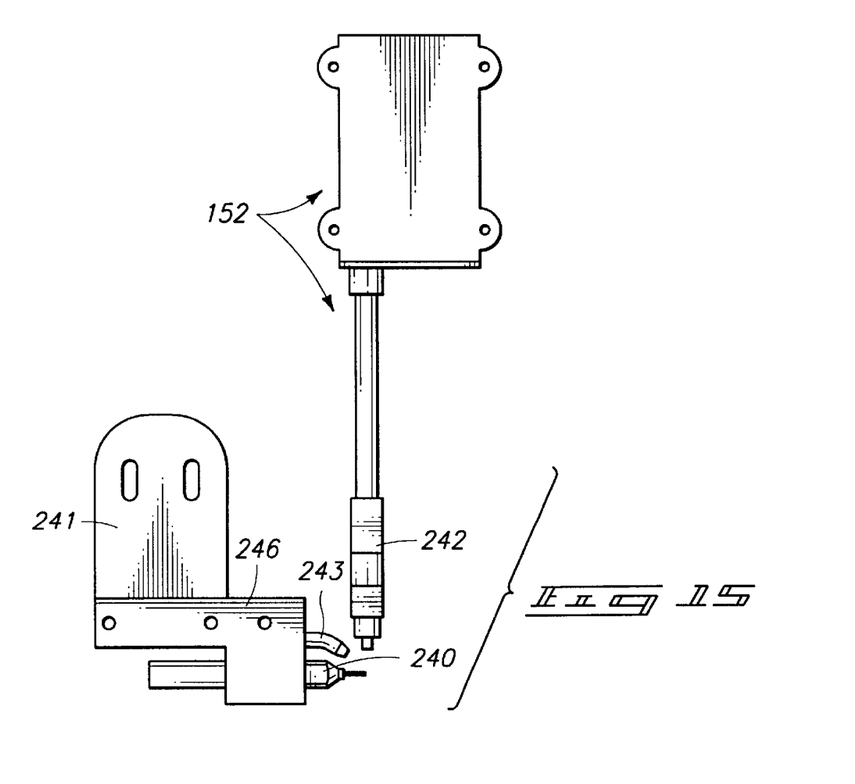
FIG. 15 is a top view of a torch assembly which may be used in the embodiment of the invention illustrated in FIG. 5.

FIG. 15 is a top view of torch assembly 156. FIG. 15 illustrates torch 240 mounted in torch framework 241, which is attached to torch bracket 246, and the torch igniter 242 is mounted relative to the torch to provide ignition. Air nozzle 243 is positioned to provide air for the torch assembly 156.

Figure 16:
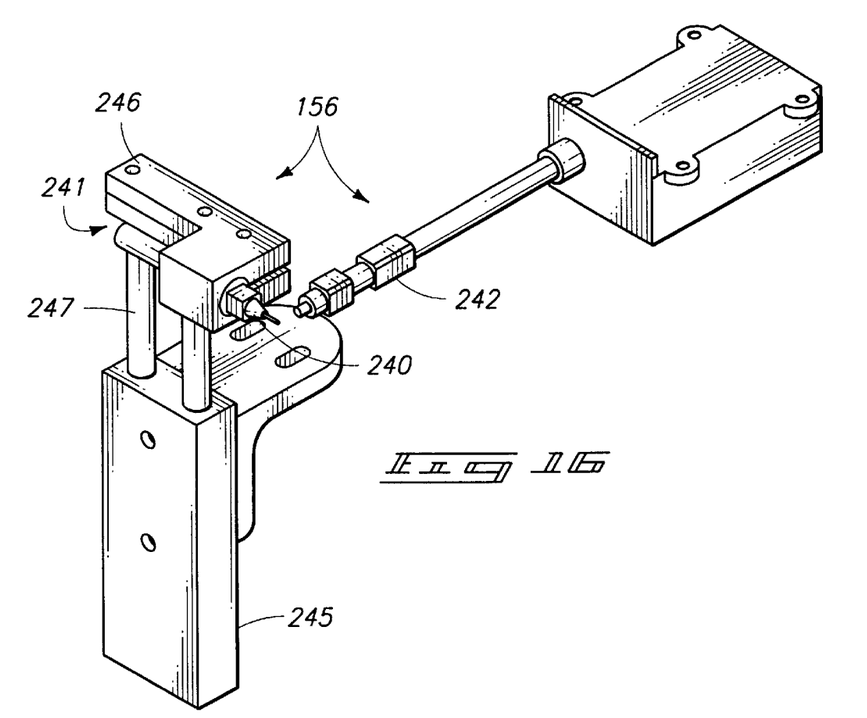
FIG. 16 is a perspective view of the embodiment of the torch assembly illustrated in FIG. 15.

FIG. 16 is a perspective view of torch assembly 156, illustrating torch igniter 242, torch framework 241, torch positioning cylinder 245, torch bracket 246 and rods 247 which allow the torch bracket 246 to be moved upward and downward as rods 247 move within torch positioning cylinder 245 to adjust the height of torch 240. The cylinder 245 combined with the rods 247 are a commonly available component.

The torch igniter assembly is a commonly known and available component from such companies as Spirig. The torch positioning cylinder is a PHD air slide which is also commonly available. The torch tip is also commonly available and may be purchased from companies such as a Spirig torch tip.

Figure 17:
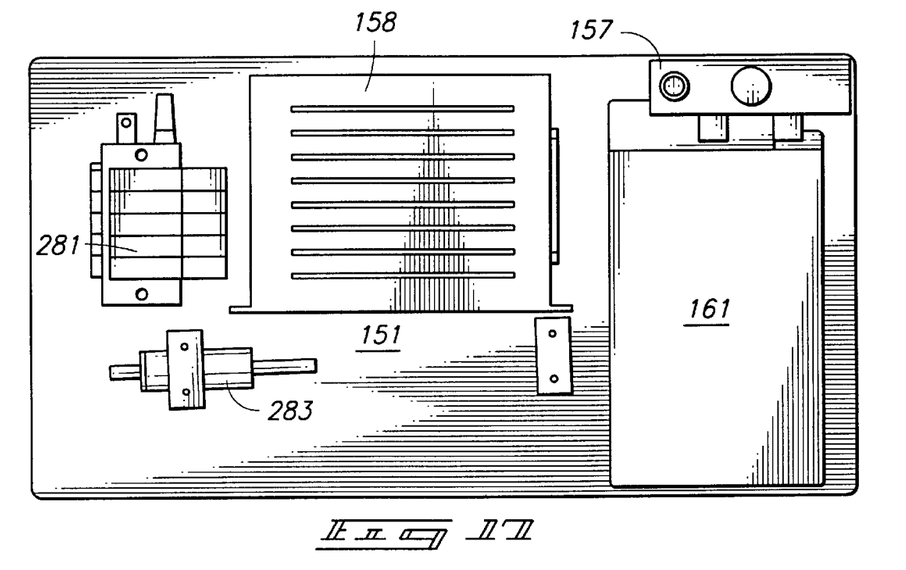
FIG. 17 is a top view of an embodiment of a chassis assembly which may be used in the embodiment of the invention illustrated in FIG. 5.

FIG. 17 is a top view of the framework 151 with miscellaneous components thereon, including actuator controller 158, air filter/regulator 157, power supply 161, flashback arrester 283, and pneumatic valves 281.

The pneumatic valves 281 may be solenoids mounted on a manifold, and which are commonly available, such as twenty-four vdc solenoids. The the actuator controller 158 may be a DS3 or DS4 actuator such as that made by or available through Intelligent Actuator. The flashback arrester 283 is generally known and may be obtained from Spirig. The air filter/regulator 157 are commonly known and available, and are available from companies such as SMC Pnuematics; and the power supply 161 may be any one of a number of available or known power supplies, such as a fifty watt, twenty-four vdc regulated power supply available through such companies as KEPKO.

The source of energy may be heat, and may be a hydrogen oxygen flame boosted with methynol, such as is available through Spirig or others, and which burns at a temperature of approximately twenty-seven hundred degrees Celsius (although no particular temperature or fuel source or type is required).

It will be appreciated by those of ordinary skill in the art that no one component in particular is necessary to practice this invention, but this is merely illustrating the preferred embodiment as required by statute.

Figure 18:
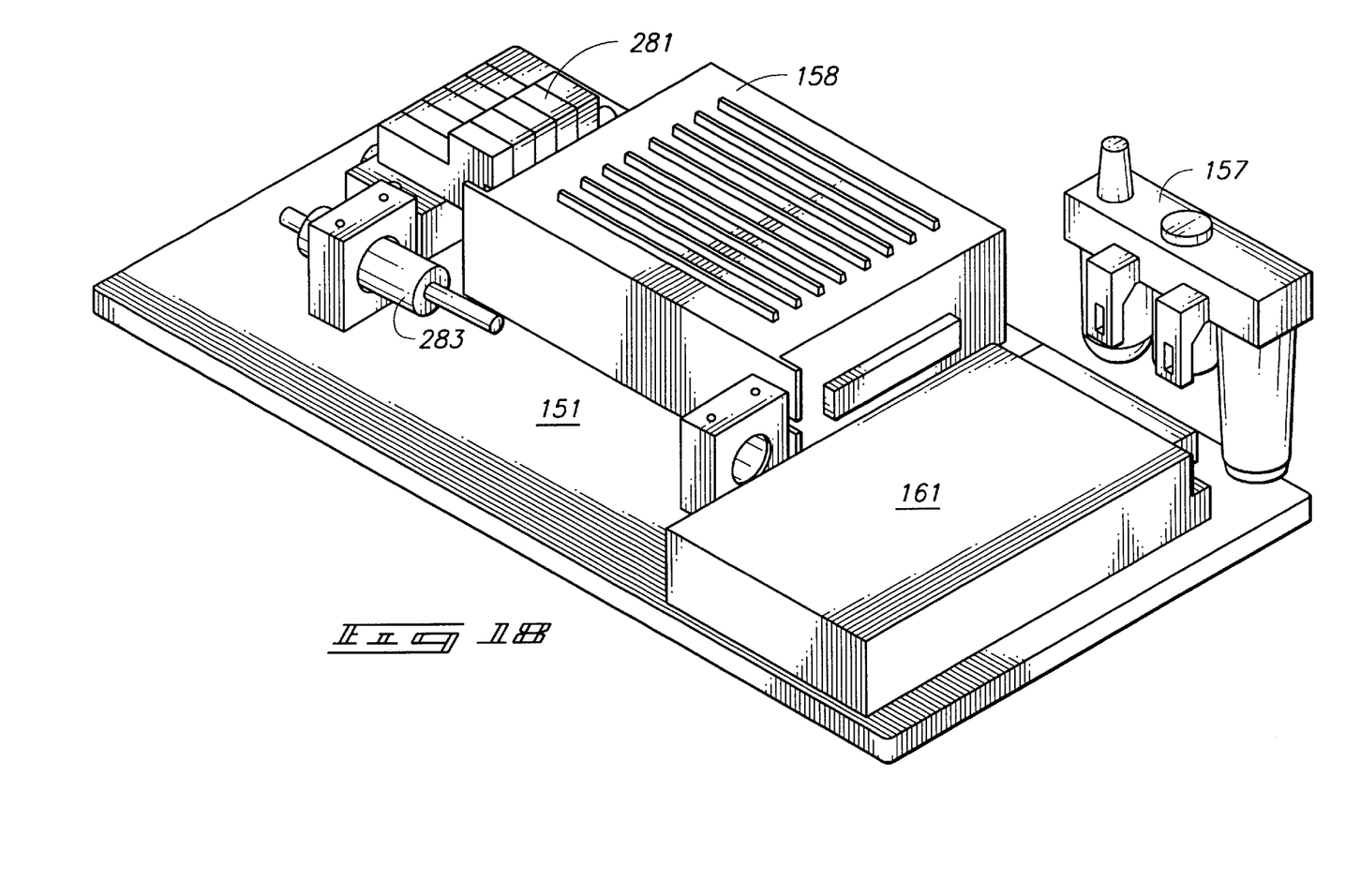
FIG. 18 is a perspective view of the embodiment of the chassis assembly illustrated in FIG. 17.

FIG. 18 is a perspective view of the framework 151 and chassis as illustrated in FIG. 17, which is one embodiment contemplated by this invention. FIG. 18 illustrates framework 151, power supply 161, pneumatic electric solenoid valves 281, air regulator 157, actuator controller 158, and flashback arrester 283.

Figure 19:
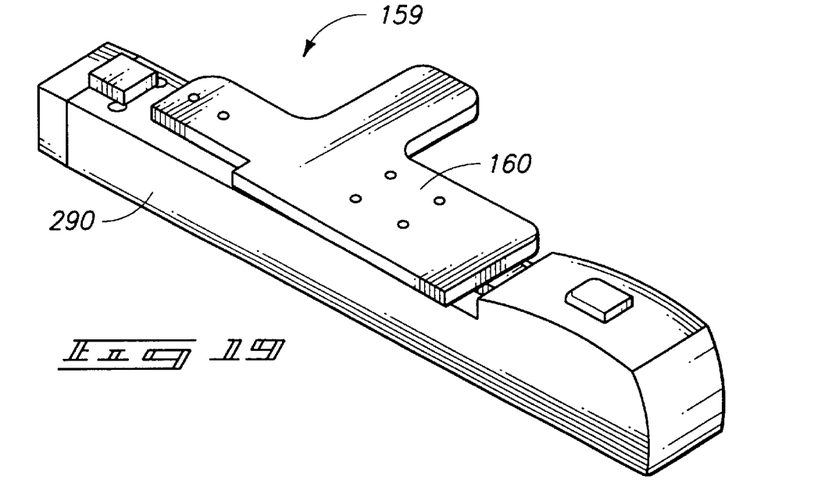
FIG. 19 is a perspective view of an embodiment of an actuator assembly which may be used in the embodiment of the invention illustrated in FIG. 5.

FIG. 19 is a perspective view of the actuator assembly 159, showing the mounting plate 160 upon which the sanding motor, torch assembly and the gripper assembly are mounted. The mounting plate 160 moves relative to actuator assembly 159, preferably in a sliding motion, to provide and control the movement of the sanding head assembly and the gripper assembly relative to the chuck assembly where the ferrule is retained.

The actuator assembly 159 may be obtained from Intelligent Actuator. Mounting plate 160 is mounted on actuator 290.

Figure 20:
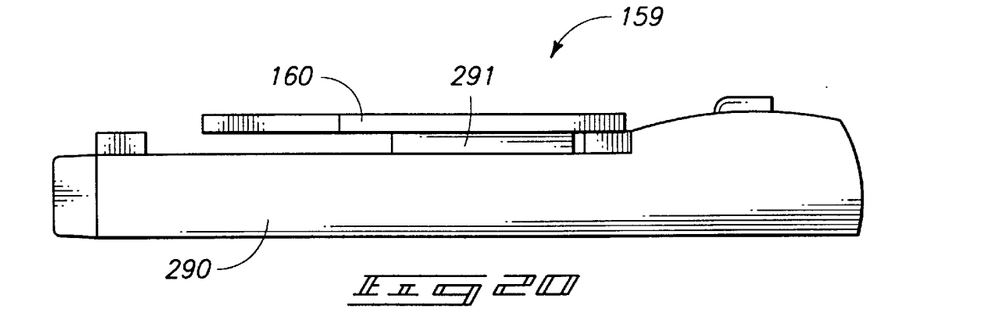
FIG. 20 is a side view of the embodiment of the actuator assembly illustrated in FIG. 19.

FIG. 20 is a side elevation view of actuator assembly 159, showing actuator 290 and mounting plate 160. Slider 291 is shown beneath mounting plate 160 in providing for the relative sliding movement of mounting plate 160.

Figure 21:
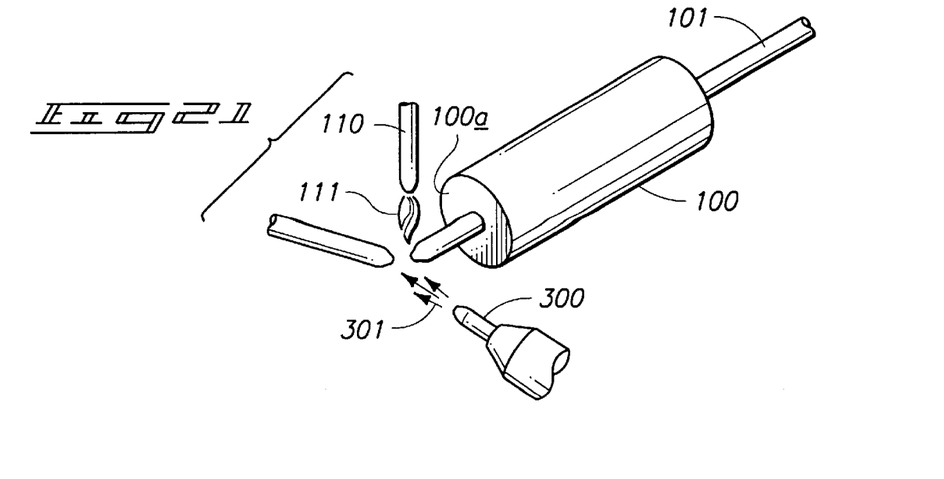
FIG. 21 is a schematic representation of a ferrule with an optical fiber secured therein, with a source of energy applying said energy to the optical fiber to heat it, and further with a gas nozzle with gas used to sever the optical fiber.

FIG. 21 is a schematic representation of certain elements of embodiments of this invention wherein the force of dynamic gas is used to sever the fiber. FIG. 21 illustrates ferrule 100 with a first end 100a, optical fiber 101 with a terminal end 101a, source of energy 110 with energy 111 being applied to optical fiber 101. In the schematic representation, the forced movement of the gas 301, preferably air, from the air nozzle 300, applied to optical fiber 101, severs the optical fiber. Again, the severance is shown further away from the first end 100a of the ferrule 100 than it would typically be, for illustrative purposes.

As will be appreciated by those of reasonable skill in the art, there are numerous embodiments to this invention, and variations of elements and components which may be used, all within the scope of this invention.

One embodiment of this invention for example is an optical fiber holding structure assembly apparatus comprising: a framework; a holding structure chuck attached to the framework, the holding structure chuck including a holding structure aperture, the holding structure aperture being adapted to receive the optical fiber holding structure with an optical fiber secured therein, a terminal end of the optical fiber protruding out of a first end of the holding structure; a source of energy disposed to direct energy between the terminal end of the optical fiber and the first end of the holding structure; and a gas discharge aperture disposed to impart gas on the optical fiber to force the terminal end to sever from the optical fiber within the holding structure.

This embodiment applies to multiple types of holding structures, such as, without limitation, a one piece fiber optic connector or an optical fiber ferrule. This embodiment may also utilized different types of gases, such as, without limitation, air; and different types of sources of energy, such as radiant or flame heat.

Another embodiment may be an optical fiber holding structure assembly apparatus comprising: a framework; a holding structure chuck attached to the framework, the holding structure chuck including a holding structure aperture, the holding structure aperture being adapted to receive the optical fiber holding structure with an optical fiber secured therein, a terminal end of the optical fiber protruding out of a first end of the holding structure; a source of energy disposed to direct energy between the terminal end of the optical fiber and the first end of the holding structure; and an impact surface disposed to impact the optical fiber to force the terminal end to sever from the optical fiber within the holding structure.

This embodiment (as all the other embodiments) also applies to multiple types of holding structures, such as, without limitation, a one piece fiber optic connector or an optical fiber ferrule. This embodiment may also utilized different types of gases, such as, without limitation, air; and different types of sources of energy, such as radiant or flame heat.

Another embodiment is an optical fiber ferrule assembly apparatus comprising: a framework; a ferrule chuck attached to the framework, the ferrule chuck including a ferrule aperture, the ferrule aperture being adapted to receive a ferrule with an optical fiber secured therein, a terminal end of the optical fiber protruding out of a first end of the ferrule; a gripper assembly attached to the framework and spaced apart from the ferrule chuck, and adapted to attach to the terminal end of the optical fiber; the gripper assembly and the ferrule chuck being disposed in movable relation to one another such that the gripper assembly and the ferrule chuck may be moved apart from one another to further severance of the terminal end of the optical fiber; and a source of energy disposed to direct energy between the terminal end of the optical fiber and the first end of the ferrule. A further embodiment may be the above referenced optical fiber ferrule assembly apparatus and further including: a polishing surface movably mounted with respect to the framework, such that movement of the polishing surface may polish the terminal end of the optical fiber when located adjacent to it; and wherein the terminal end of the optical fiber and the polishing surface are disposed to be moved adjacent one another such that the polishing surface may be applied to the terminal end of the optical fiber.

Another embodiment of a optical fiber ferrule assembly apparatus may comprise: a framework; a ferrule chuck attached to the framework, the ferrule chuck including a ferrule aperture, the ferrule aperture being adapted to receive a ferrule with an optical fiber secured therein, a terminal end of the optical fiber protruding out of a first end of the ferrule; and a source of energy disposed to direct energy between the terminal end of the optical fiber and the first end of the ferrule, thereby softening the optical fiber for severance.

Another embodiment may be for an optical fiber ferrule assembly comprising: a ferrule body with a first end, a second end and an internal cavity in which an optical fiber is secured; the optical fiber including a terminal end protruding from the first end of the ferrule body, the terminal end of the optical fiber having a heat severed terminal surface thereon.

There are also process embodiments within the contemplation of this invention, such as, without limitation, a process for making an optical fiber ferrule, comprised of the following steps: providing a ferrule with a first end and a second end, the ferrule having an internal cavity in which an optical fiber with a terminal end is secured, with the terminal end of the optical fiber protruding through the first end of the ferrule; attaching a gripper assembly to the terminal end of the optical fiber; applying localized energy to the optical fiber near the first end of the ferrule; pulling the terminal end of the optical fiber and the ferrule apart from one another, thereby severing the optical fiber in a predetermined location. A further process embodiment may further comprise the step of applying a polishing surface to the terminal end of the optical fiber protruding from the first end of the ferrule.

Another possible process embodiment may be a process for making an optical fiber ferrule, comprised of the following steps: providing a ferrule with a first end and a second end, the ferrule having an internal cavity in which an optical fiber with a terminal end is secured, with the terminal end of the optical fiber protruding through the first end of the ferrule; applying localized energy to the optical fiber near the first end of the ferrule; and forcing the terminal end of the optical fiber and the ferrule apart from one another, thereby severing the optical fiber in a predetermined location.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An optical fiber holding structure assembly apparatus comprising:
   (a) a framework;
   (b) a holding structure chuck attached to the framework, the holding structure chuck including a holding structure aperture, the holding structure aperture being adapted to receive the optical fiber holding structure with an optical fiber secured therein, a terminal end of the optical fiber protruding out of a first end of the holding structure;
   (c) a source of energy disposed to direct energy between the terminal end of the optical fiber and the first end of the holding structure; and
   (d) a gas discharge aperture disposed to impart gas on the optical fiber to force the terminal end to sever from the optical fiber within the holding structure.

2. An optical fiber holding structure assembly apparatus as recited in claim 1 and wherein the holding structure is an optical fiber ferrule.

3. An optical fiber holding structure assembly apparatus as recited in claim 1 and wherein the gas is air.

4. An optical fiber holding structure assembly apparatus as recited in claim 1 and wherein the source of energy is heat.

5. An optical fiber holding structure assembly apparatus comprising:
   (a) a framework;
   (b) a holding structure chuck attached to the framework, the holding structure chuck including a holding structure aperture, the holding structure aperture being adapted to receive the optical fiber holding structure with an optical fiber secured therein, a terminal end of the optical fiber protruding out of a first end of the holding structure;
   (c) a source of energy disposed to direct energy between the terminal end of the optical fiber and the first end of the holding structure; and
   (d) an impact surface disposed to impact the optical fiber to force the terminal end to sever from the optical fiber within the holding structure.

6. An optical fiber holding structure assembly apparatus as recited in claim 5 and wherein the holding structure is an optical fiber ferrule.

7. An optical fiber holding structure assembly apparatus as recited in claim 5 and wherein the source of energy is heat.

8. An optical fiber ferrule assembly apparatus comprising:
   (a) a framework;
   (b) a ferrule chuck attached to the framework, the ferrule chuck including a ferrule aperture, the ferrule aperture being adapted to receive a ferrule with an optical fiber secured therein, a terminal end of the optical fiber protruding out of a first end of the ferrule;
   (c) a gripper assembly attached to the framework and spaced apart from the ferrule chuck, and adapted to attach to the terminal end of the optical fiber;
   (d) the gripper assembly and the ferrule chuck being disposed in movable relation to one another such that the gripper assembly and the ferrule chuck may be moved apart from one another to further severance of the terminal end of the optical fiber; and
   (e) a source of energy disposed to direct energy between the terminal end of the optical fiber and the first end of the ferrule.

9. An optical fiber ferrule assembly apparatus as recited in claim 8, and further comprising:
   (a) a polishing surface movably mounted with respect to the framework, such that movement of the polishing surface may polish the terminal end of the optical fiber when located adjacent to it; and
   (b) wherein the terminal end of the optical fiber and the polishing surface are disposed to be moved adjacent one another such that the polishing surface may be applied to the terminal end of the optical fiber.

10. An optical fiber ferrule assembly apparatus as recited in claim 8, and further wherein the source of energy is heat.

11. An optical fiber ferrule assembly apparatus as recited in claim 8, and further wherein the source of energy is radiation.

12. An optical fiber ferrule assembly apparatus comprising:
   (a) a framework;
   (b) a ferrule chuck attached to the framework, the ferrule chuck including a ferrule aperture, the ferrule aperture being adapted to receive a ferrule with an optical fiber secured therein, a terminal end of the optical fiber protruding out of a first end of the ferrule; and
   (c) a source of energy disposed to direct energy between the terminal end of the optical fiber and the first end of the ferrule, thereby softening the optical fiber for severance.

13. An optical fiber holding structure assembly apparatus as recited in claim 12 and wherein the holding structure is an optical fiber ferrule.

14. An optical fiber holding structure assembly apparatus as recited in claim 12 and wherein the source of energy is heat.

15. An optical fiber ferrule assembly comprising:
   (a) a ferrule body with a first end, a second end and an internal cavity in which an optical fiber is secured;
   (b) the optical fiber including a terminal end protruding from the first end of the ferrule body, the terminal end of the optical fiber having a heat severed terminal surface thereon.

16. A process for making an optical fiber ferrule, comprised of the following steps:
   (a) providing a ferrule with a first end and a second end, the ferrule having an internal cavity in which an optical fiber with a terminal end is secured, with the terminal end of the optical fiber protruding through the first end of the ferrule;
   (b) attaching a gripper assembly to the terminal end of the optical fiber;
   (c) applying localized energy to the optical fiber near the first end of the ferrule;
   (d) pulling the terminal end of the optical fiber and the ferrule apart from one another, thereby severing the optical fiber in a predetermined location.

17. A process for making an optical fiber ferrule as recited in claim 16, and further comprising the step of applying a polishing surface to the terminal end of the optical fiber protruding from the first end of the ferrule.

18. A process for making an optical fiber ferrule, comprised of the following steps:
   (a) providing a ferrule with a first end and a second end, the ferrule having an internal cavity in which an optical fiber with a terminal end is secured, with the terminal end of the optical fiber protruding through the first end of the ferrule;
   (b) applying localized energy to the optical fiber near the first end of the ferrule; and
   (c) forcing the terminal end of the optical fiber and the ferrule apart from one another, thereby severing the optical fiber in a predetermined location.

* * * * *